United States Patent
Han et al.

(10) Patent No.: US 12,439,484 B2
(45) Date of Patent: Oct. 7, 2025

(54) INDUCTION HEATING DEVICE PROVIDING IMPROVED USER EXPERIENCE AND USER INTERFACE

(71) Applicant: LG Electronics Inc., Seoul (KR)

(72) Inventors: Hyeonna Han, Seoul (KR); Mijin Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 973 days.

(21) Appl. No.: 17/604,589

(22) PCT Filed: Apr. 16, 2020

(86) PCT No.: PCT/KR2020/005084
§ 371 (c)(1),
(2) Date: Oct. 18, 2021

(87) PCT Pub. No.: WO2020/213950
PCT Pub. Date: Oct. 22, 2020

(65) Prior Publication Data
US 2022/0201810 A1    Jun. 23, 2022

(30) Foreign Application Priority Data

Apr. 18, 2019  (KR) .................. 10-2019-0045752

(51) Int. Cl.
*H05B 6/12* (2006.01)
*F24C 7/08* (2006.01)
(Continued)

(52) U.S. Cl.
CPC ........... *H05B 6/1218* (2013.01); *F24C 7/086* (2013.01); *G06F 3/04847* (2013.01);
(Continued)

(58) Field of Classification Search
CPC .. F24C 7/086; F24C 7/08; G06F 1/182; G06F 1/3206; G06F 1/3265; G06F 1/3287;
(Continued)

(56) References Cited

U.S. PATENT DOCUMENTS

2006/0289489 A1\* 12/2006 Wang .................. H05B 6/062
219/622
2011/0303653 A1  12/2011 Chun et al.
(Continued)

FOREIGN PATENT DOCUMENTS

EP    2688364    1/2014
EP    2988573    2/2016
(Continued)

OTHER PUBLICATIONS

Office Action in Korean Appln. No. 1020190045752, mailed on Dec. 22, 2023, 15 pages (with English translation).
(Continued)

*Primary Examiner* — Edward F Landrum
*Assistant Examiner* — Adam M Eckardt
(74) *Attorney, Agent, or Firm* — Fish & Richardson P.C.

(57) ABSTRACT

An induction heating device includes a case, working coils, a cover plate coupled to the case, an input interface buried into the cover plate and configured to receive a touch input from a user, a first control module configured to sense which working coil has an object to be heated, and a second control module configured to receive position information of the object from the first control module and the touch input from the input interface and to control a specific image displayed on the input interface based on the position information or the touch input. Based on the touch input indicating a small object, the second control module controls the input interface to display an image for guiding an optimal heating
(Continued)

position of the small object in one area of the input interface, which does not overlap with the position of the object.

11 Claims, 7 Drawing Sheets

(51) Int. Cl.
*G06F 3/04847* (2022.01)
*G06F 3/0488* (2022.01)

(52) U.S. Cl.
CPC ......... *G06F 3/0488* (2013.01); *H05B 6/1272* (2013.01); *H05B 2213/03* (2013.01); *H05B 2213/05* (2013.01)

(58) Field of Classification Search
CPC ............... G06F 3/0482; G06F 3/04842; G06F 3/04847; G06F 3/0488; G06F 1/18; G06F 1/3234; Y02D 10/00; H05B 2213/03; H05B 2213/05; H05B 6/062; H05B 6/1218; H05B 6/1272; H05B 6/065; H05B 6/1281; H05B 6/12; H05B 6/06; Y02B 40/00
See application file for complete search history.

(56) References Cited

U.S. PATENT DOCUMENTS

| | | | | |
|---|---|---|---|---|
| 2012/0248098 A1* | 10/2012 | Lee | ...................... | H05B 6/1272 219/660 |
| 2020/0022228 A1 | 1/2020 | Heo | | |

FOREIGN PATENT DOCUMENTS

| | | | | | |
|---|---|---|---|---|---|
| JP | 2004253297 | A | * | 9/2004 | |
| JP | 2009238613 | | | 10/2009 | |
| JP | 2009238613 | A | * | 10/2009 | ............ H05B 6/062 |
| JP | 2014078533 | | | 5/2014 | |
| JP | 6052585 | | | 12/2016 | |
| JP | 6227162 | | | 11/2017 | |
| JP | 6227162 | B2 | * | 11/2017 | |
| KR | 20110136226 | A | | 12/2011 | |
| KR | 101904642 | | | 10/2018 | |

OTHER PUBLICATIONS

Extended European Search Report in European Appln. No. 20792081. 0, mailed on Nov. 29, 2022, 13 pages.

* cited by examiner

300

INDUCTION HEATING DEVICE PROVIDING IMPROVED USER EXPERIENCE AND USER INTERFACE

CROSS-REFERENCE TO RELATED APPLICATIONS

This application is a National Stage application under 35 U.S.C. § 371 of International Application No. PCT/KR2020/005084, filed on Apr. 16, 2020, which claims the benefit of Korean Patent Application No. 10-2019-0045752, filed on Apr. 18, 2019. The disclosures of the prior applications are incorporated by reference in their entirety.

TECHNICAL FIELD

The present invention relates to an induction heating device that can provide improved user experience (UX) and user interface (UI).

BACKGROUND ART

Various types of cooking apparatuses are used to heat food at homes and restaurants. Conventionally, gas ranges that are fueled by gas have been widely used. However, in recent years, apparatuses that are used to heat an object subject to heating such as a vessel including a pot, using electricity instead of gas, have been used.

Methods for heating an object subject to heating using electricity are broadly classified as a resistance heating method and an induction heating method. The resistance heating method is a method by which an object subject to heating is heated by heat that is generated when electric current flows through a metallic resistance wire, or through a non-metallic heating element such as silicon carbide and that then is delivered to the object subject to heating (e.g., a cooking vessel) through radiation or conduction. The induction heating method is a method by which an object subject to heating itself is heated by eddy currents that are generated in the object subject to heating, which is comprised of metallic ingredients, using a magnetic field that is generated around a coil when a predetermined magnitude of high-frequency power is supplied to the coil.

An induction heating device to which the method of induction heating is applied is generally provided with a working coil respectively in a corresponding area to heat each of the plurality of objects subject to heating (e.g., a cooking vessel).

However, recently, an induction heating device (i.e., a zone free-type induction heating device), in which a plurality of working coils simultaneously heat a single object, has been widely used. The zone free-type induction heating device may inductively heat an object subject to heating regardless of a size and position of the object subject to heating in an area where a plurality of working coils are provided.

A zone free-type induction heating device is disclosed in Japanese Patent No. 6052585B2.

The zone free-type induction heating device may be provided with an input interface. The input interface, which is a module for inputting heating intensity or driving time and the like desired by a user, may be implemented in various different forms including a physical button or a touch panel and the like. Further, the input interface may be provided with a display panel (i.e., a touch screen-type panel) that displays a driving state (e.g., a burner image for an object subject to heating) of the induction heating device.

However, in case an object subject to heating (e.g., a small vessel such as a Moka pot) has a small size, the object subject to heating may often be eccentrically placed at an upper side of a working coil. Accordingly, problems such as decreased energy efficiency and increased cooking time and the like may occur.

DETAILED DESCRIPTION OF INVENTION

Technical Problems

The present invention is directed to an induction heating device that may suggest an optimal heating position of a small object subject to heating to a user.

The present invention is also directed to an induction heating device that may provide improved user experience (UX) and user interface (UI).

Aspects of the present invention are not limited to the above-described ones. Additionally, other aspects and advantages that have not been mentioned may be clearly understood from the following description and may be more clearly understood from embodiments. Further, it will be understood that the aspects and advantages of the present invention may be realized via means and combinations thereof that are described in the appended claims.

Solutions to Problem

According to an embodiment, an induction heating device may display an image for guiding an optimal heating position of a small object subject to heating through an input interface, and may alternately turn on and turn off a light-emitting element around the optimal heating position of the small object subject to heating, thereby making it possible to suggest the optimal heating position of the small object subject to heating to a user.

According to an embodiment, an induction heating device may include an input interface that is flatly buried into an upper surface of a cover plate, that receives a touch input from a user and that displays a specific image, a second control module that controls a specific image displayed on the input interface on the basis of the touch input supplied by the input interface, and a first control module that controls the driving of at least one of a plurality of working coils on the basis of the touch input supplied by the second control module, thereby making it possible to provide improved user experience and user interface.

Effects of the Invention

The induction heating device may suggest an optimal heating position of a small object subject to heating to a user, thereby making it possible to reduce the possibility that the small object subject to heating is eccentrically placed at an upper side of a working coil and to solve problems such as decreased energy efficiency and increased cooking time and the like caused by the eccentric arrangement of the small object subject to heating.

The induction heating device may provide improved user experience and user interface, thereby enhancing user convenience under different conditions.

DETAILED DESCRIPTION OF EMBODIMENTS

Figure 1:
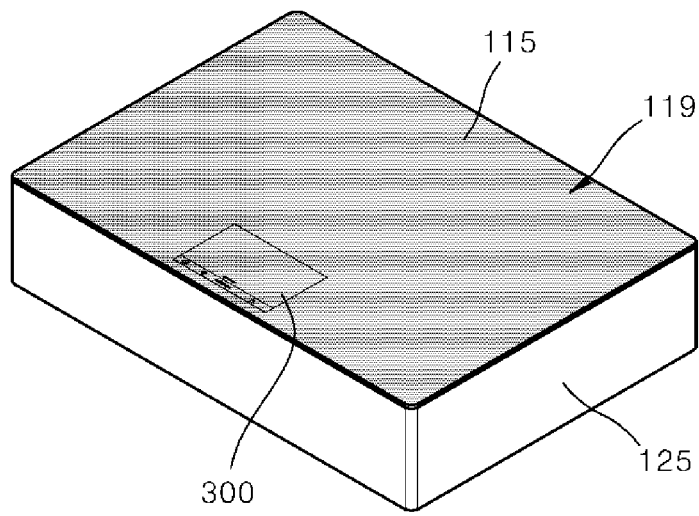
FIG. 1 is a perspective view illustrating an induction heating device according to an exemplary embodiment of the present invention.

The above-described aspects, features and advantages are specifically described with reference to the accompanying drawings hereunder such that one having ordinary skill in the art to which the present invention pertains may easily implement the technical spirit of the invention. In describing the invention, detailed description of known technologies in relation to the invention is omitted if it is deemed to make the gist of the present invention unnecessarily vague. Below, preferred embodiments of the present invention are specifically described with reference to the accompanying drawings. Throughout the drawings, identical reference numerals denote identical or similar components.

When any component is described as being "at an upper portion (or a lower portion)" of a component, or "on (or under)" a component, any component may be placed on the upper surface (or the lower surface) of the component, and an additional component may be interposed between the component and any component placed on (or under) the component.

When a component is described as being "connected," "coupled" or "connected" to another component, the components may be directly connected or coupled; however, it is also to be understood that an additional component may be "interposed" between the components, or the components may be "connected," "coupled" or "connected" through an additional component.

Below, an induction heating device according to an embodiment is described.

Figure 2:
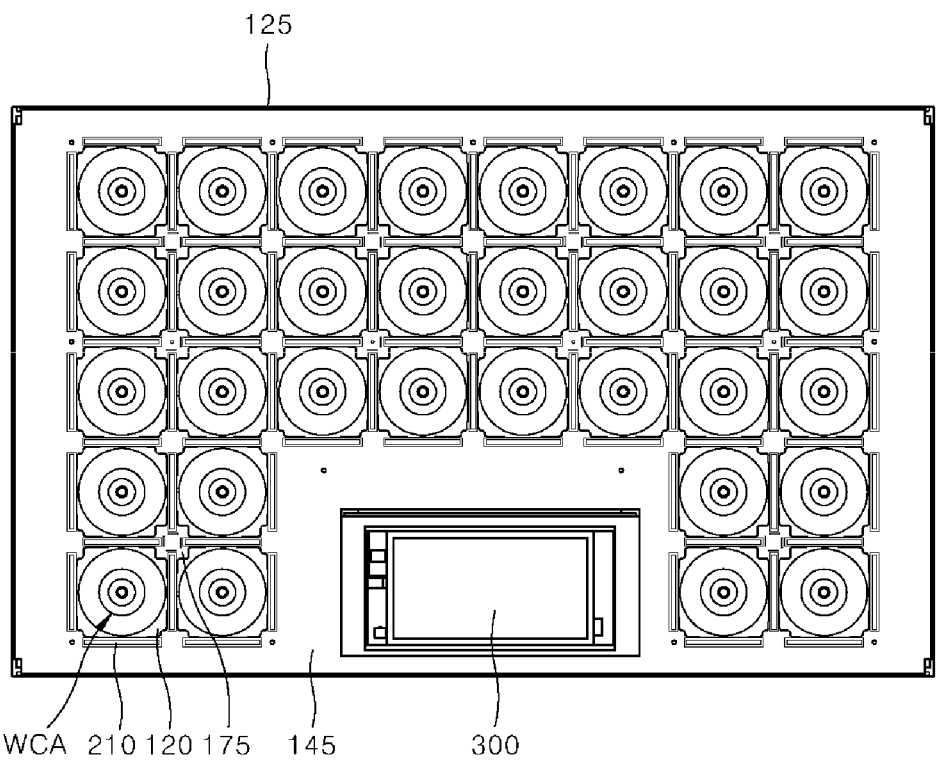
FIG. 2 is a plane view illustrating a state in which some components of the induction heating device in FIG. 1 are omitted according to an exemplary embodiment of the present invention.
Figure 3:
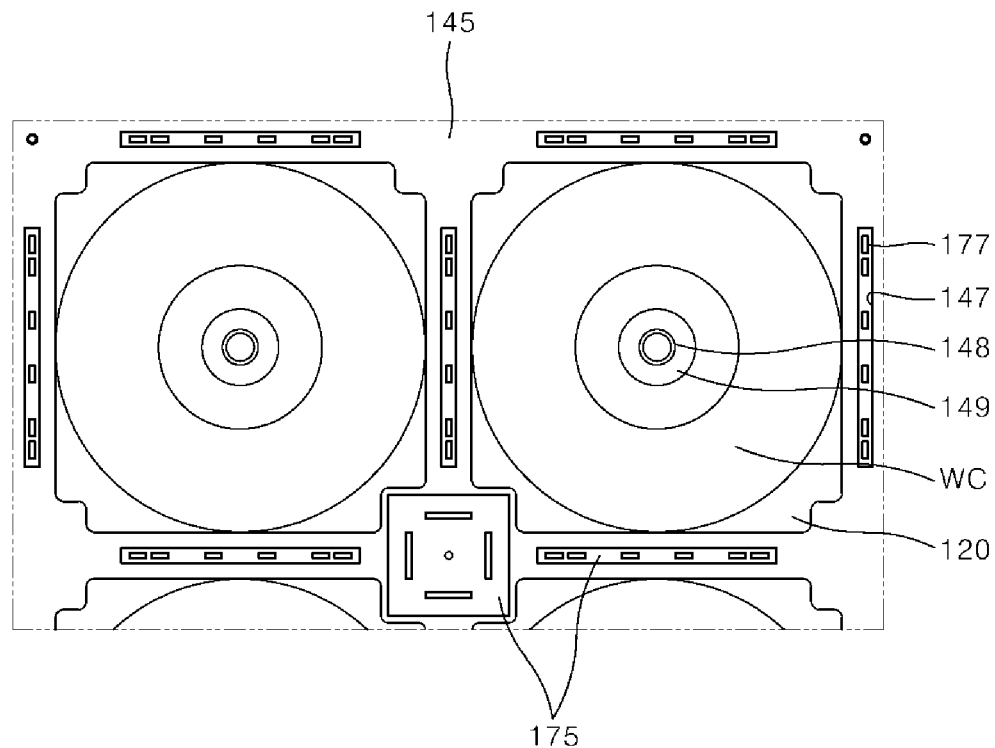
FIGS. 3 and 4 are partially enlarged views illustrating the induction heating device in FIG. 2 according to an exemplary embodiment of the present invention.
Figure 4:
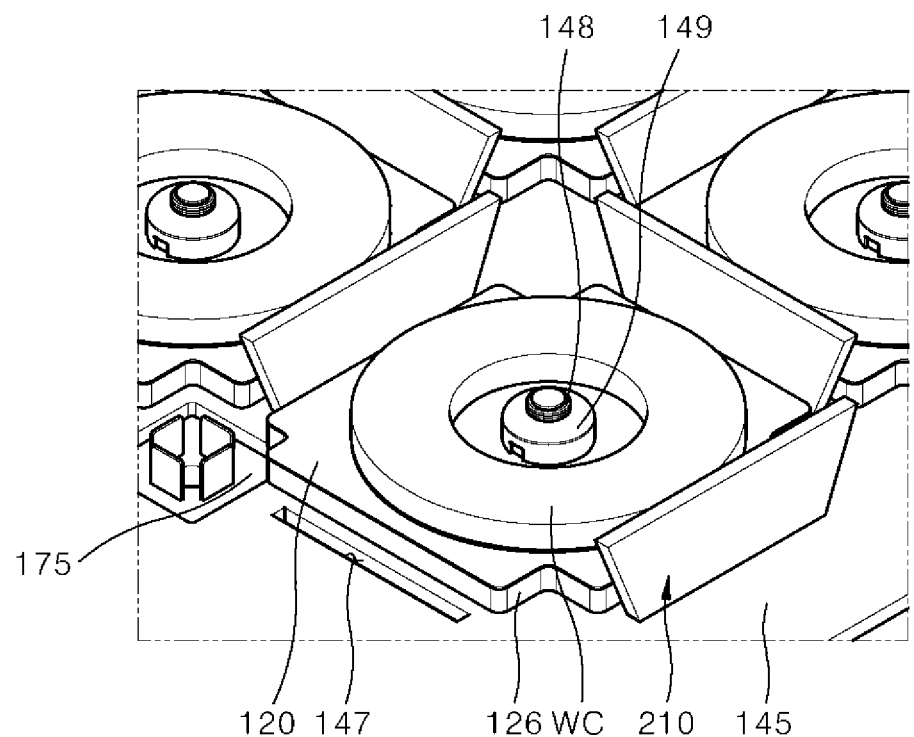
Figure 5:
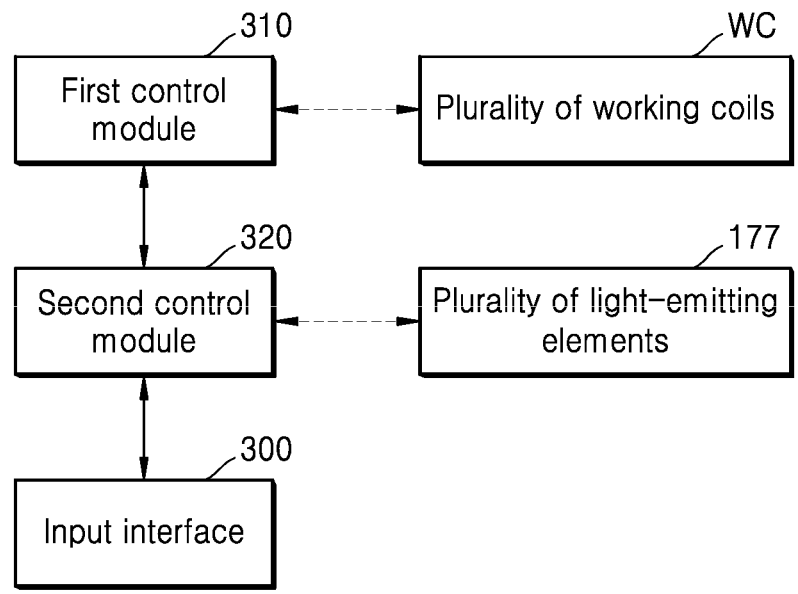
FIG. 5 is a block diagram for describing a flow of control of the induction heating device in FIG. 1 according to an exemplary embodiment of the present invention.

FIG. 1 is a perspective view illustrating an induction heating device according to an exemplary embodiment of the present invention. FIG. 2 is a plane view illustrating a state in which some components of the induction heating device in FIG. 1 are omitted according to an exemplary embodiment of the present invention. FIGS. 3 and 4 are partially enlarged views illustrating the induction heating device in FIG. 2 according to an exemplary embodiment of the present invention. FIG. 5 is a block diagram for describing a flow of control of the induction heating device in FIG. 1 according to an exemplary embodiment of the present invention.

For convenience of description, FIG. 2 is a view illustrating an induction heating device without a cover plate 119 in FIG. 1, and FIGS. 3 and 4 are views illustrating a state in which some components (e.g., a light guide) of the induction heating device 1 in FIG. 2 are omitted.

Referring to FIGS. 1 to 5, the induction heating device 1 according to an exemplary embodiment of the present invention may include a case 125, a cover plate 119, a base plate 145, an indicator substrate 175, an indicator (i.e., an indicator comprised of a light-emitting element 177 and a light guide 210), an input interface 300, a first control module 310, a second control module 320, a working coil assembly (WCA).

The case 125 may be thermally insulated to prevent heat generated by a working coil (WC) from leaking outwards.

The case 125 may be provided with various components such as the working coil assembly (WCA), the base plate 145, the indicator substrate 175, the light-emitting element 177 and the light guide 210 and the like that constitute the induction heating device 1.

The case 125 may be further provided with various devices (e.g., a power supply that supplies AC power, a rectifier that rectifies AC power of the power supply into DC power, an inverter that converts DC power rectified by the rectifier into a resonance current through a switching operation and that supplies the resonance current to a working coil (WC), a relay or a semiconductor switch that turns on or turns off a working coil (WC), and the like) in relation to the driving of the working coil (WC), an indicator substrate supporter (not illustrated) where an indicator substrate 175 is installed, a blowing fan (not illustrated) that cools heat generated in a working coil (WC) or a light-emitting element 177 and the like. Detailed description in relation to those devices is omitted.

The cover plate 119 may be coupled to an upper end of the case 125 and may shield an inside of the case 125. An object subject to heating (not illustrated) may be placed on an upper surface of the cover plate 119.

Specifically, the cover plate 119 may include an upper plate 115 (i.e., the upper surface of the cover plate 119) for placing an object subject to heating such as a cooking vessel, and heat generated in the working coil (WC) may be delivered to the object subject to heating through the upper plate 115.

The upper plate 115, for example, may be made of a glass material, and an input interface 300 that receives a touch input from a user and delivers the touch input to the second control module 320 may be installed on the upper plate 115.

The input interface 300 may be flatly buried into the upper surface of the cover plate 119, i.e., may be flatly buried into the upper plate 115 (That is, the input interface 300 may be installed flatly on the same flat surface as the upper plate 115.), and may be controlled by the second control module 320 to display a specific image (e.g., a burner image, a remaining heat image, a heating intensity image, a timer image, an image for guiding an optimal heating position of a small object subject to heating and the like.). Further, the input interface 300 may receive a touch input from the user and may supply the received touch input to the second control module 320.

The input interface 300, which is a module for inputting heating intensity or heating time and the like desired by the user, may be implemented in various different forms such as a physical button or a touch panel and the like. Additionally, the input interface 300 may be provided with a display panel (i.e., a touch screen-type panel) that displays a driving state and the like of the induction heating device 1.

The input interface 300 may deliver a touch input supplied by the user to the second control module 320, and the second control module 320 may deliver the touch input to the first control module 310. Detailed description in relation to this is described hereunder.

The working coil assembly (WCA) may include a working coil (WC), a ferrite core 126, and a mica sheet 120 (i.e., a first mica sheet).

In case the induction heating device 1 is a zone free-type induction heating device, a plurality of working coil assemblies (WCA), as illustrated in FIG. 2, may be provided, and the plurality of working coil assemblies (e.g., WCA) may be spaced a predetermined distance apart from each other.

A plurality of working coils (e.g., WC) included in the plurality of working coil assemblies (e.g., WCA) may be controlled individually or in a group.

Specifically, the plurality of working coils, for example, may be controlled in a group such as a first working coil group (one or more working coils) and a second working coil group (one or more working coils), and each working coil group may be independently controlled by an individual inverter. Working coils included in each working coil group may be independently controlled by the above-described relay or semiconductor switch.

For convenience of description, a single working coil assembly (WCA) is described as an example.

The working coil (WC) may be comprised of wires that are wound in a ring shape a plurality of times, and may generate an AC magnetic field. Additionally, the driving of the working coil (WC) may be controlled by the first control module 310, and a mica sheet 120 and a ferrite core 126 may be consecutively disposed at a lower side of the working coil (WC).

The ferrite core 126 may be disposed at the lower side of the working coil (WC), and a core hole (not illustrated) may be formed at a central portion of the ferrite core 126 to perpendicularly overlap with a ring-shaped inside of the working coil (WC).

Specifically, a base plate 145 may be disposed at a lower side of the ferrite core 126, and the mica sheet 120 may be disposed between the ferrite core 126 and the working coil (WC).

As illustrated in FIGS. 3 and 4, a packing gasket 149 may be coupled to the corer hole such that the ferrite core 126 is fixed onto the base plate 145. A sensor 148 may be installed at an upper end of the packing gasket 149. The sensor 148 may sense a temperature of the upper plate 115, and a temperature or an operation and the like of the working coil (WC), and may deliver temperature information or operation information and the like to the above-described second control module 320 or the first control module 310.

The ferrite core 126 may be fixed to the mica sheet 120 through a sealant, and may spread an AC magnetic field generated in the working coil (WC).

The mica sheet 120 (i.e., a first mica sheet) may be disposed between the working coil (WC) and the ferrite core 126, and may be provided with a sheet hole (not illustrated) at a central portion thereof to perpendicularly overlap with the ring-shaped inside of the working coil (WC).

The mica sheet 120 may be fixed to the working coil (WC) and the ferrite core 126 through a sealant, and may prevent heat generated by the working coil (WC) from being directly delivered to the ferrite core 126.

Though not illustrated in the drawings, the working coil assembly (WCA) may further include a second mica sheet (not illustrated) that is fixed to the upper end of the working coil (WC) through a sealant and that is provided with a second sheet hole (not illustrated) formed at a central portion of the second mica sheet to perpendicularly overlap with the ring-shaped inside of the working coil (WC).

For convenience of description, detailed description in relation to the second mica sheet is omitted.

The working coil assembly (WCA) may be installed at the base plate 145.

Specifically, the ferrite core 126, the mica sheet 120, and the working coil (WC) may be consecutively stacked on the base plate 145. An indicator substrate 175 may be placed to be spaced apart from the base plate 145 at a lower side of the base plate 145.

The base plate 145, for example, may be integrally formed and may be made of aluminum (Al), but not be limited.

Further, the base plate 145 may be provided with a light guide 210.

Specifically, the light guide 210 may be provided around the working coil (WC) at the base plate 145. That is, four light guides (e.g., 210) per a single working coil (WC) may be installed around the working coil (WC).

The light guide 210 may display light, emitted from a light-emitting element 177, through a light-emitting surface (i.e., an upper surface) of an upper end thereof, and may display whether the working coil (WC) operates and may display output intensity (i.e., heating intensity) of the working coil (WC). Each light guide 210 may be installed at each light guide installation hole 147 formed at the base plate 145.

The light guide installation hole 147 for installing a light guide 210, as illustrated in FIGS. 3 and 4, may be formed at the base plate 145 in a space between the ferrite cores. That is, the light guide installation hole 147 may be formed at the base plate 145 along a position where the light guide 210 is installed. Accordingly, the light guide installation hole 147 may also be formed around a working coil (WC), and four light guide installation holes (e.g., 147) per a single working coil (WC) may be formed around the working coil (WC).

The number of the light guide installation holes 147 may be the same as the number of the light guides 210.

Light emitted from a light-emitting element 177 installed at the indicator substrate 175 may be delivered to the light guide 210 through the light guide installation hole 147. Accordingly, the light guide 210 may display whether the working coil (WC) operates and may display output intensity (i.e., heating intensity) of the working coil (WC).

The indicator substrate 175 may be spaced apart from the base plate 145 at the lower side of the base plate 145, and a light-emitting element 177 may be installed at the indicator substrate 175.

Specifically, the indicator substrate 175 may be installed on an indicator substrate supporter (not illustrated) to be spaced downwards apart from the base plate 145. The indicator substrate 175, for example, may be implemented in the form of a printed circuit board (PCB). Though not illustrated in the drawings, the indicator substrate 175 may be further provided with various components for driving the light-emitting element 177.

As illustrated in FIG. 3, a plurality of light-emitting elements (e.g., 177) may be provided and may be installed at the indicator substrate 175 (i.e., a lower side of the light guide 210) through the light guide installation hole 147 to be exposed upwards. Accordingly, light emitted from the light-emitting element 177 may be delivered to the light guide 210 through the light guide installation hole 147.

The plurality of light-emitting elements (e.g., 177), for example, may include a light-emitting diode (LED) respectively, and may be controlled by the second control module 320.

The first control module 310 may control the driving of the plurality of working coils (e.g., WC).

The first control module 310 may detect a degree of a reduction in resonance currents flowing in each working coil, and, on the basis of results of the detection, may sense a working coil that has an object subject to heating at an upper side thereof.

In case an object subject to heating is placed on a working coil (WC), the entire resistance may be increased due to resistance of the object subject to heating. Accordingly, a degree to which a resonance current flowing in the working coil (WC) is reduced may be increased.

The first control module 310, as described above, detects a resonance current flowing in a working coil (WC), and, on the basis of a value of the detection, may detect whether an object subject to heating is placed on the working coil (WC).

Certainly, the first control module 310 may sense an object subject to heating using another method. In the embodiment, the above-described method used to detect an object subject to heating is described as an example.

The first control module 310 may supply information of a position of the sensed object subject to heating to the second control module 320 and may receive a user's touch input from the second control module 320.

Certainly, the first control module 310 may control the driving of at least one of the plurality of working coils (e.g., WC) on the basis of the user's touch input supplied by the second control module 320.

The second control module 320 may control an image displayed on the input interface 300 and the driving of the plurality of light-emitting elements (e.g., 177).

Specifically, the second control module 320 may receive a user's touch input from the input interface 300, and may supply the received touch input to the first control module 310 or may control the input interface 300 or the light-emitting element 177 on the basis of the received touch input.

The second control module 320 may receive information on a position of an object subject to heating from the first control module 310 and may control the input interface 300 such that a burner image for the object subject to heating is displayed on the input interface 300 on the basis of the received information on the position of the object subject to heating.

Certainly, the second control module 320 may control (i.e., turn on) driving of a light-emitting element around a lower side of the sensed object subject to heating among the plurality of light-emitting elements on the basis of the received information on the position of the object subject to heating.

Further, the second control module 320 may control a specific image displayed on the input interface 300 on the basis of at least one of the received information on the position of the object subject to heating and the received touch input.

That is, in case the touch input (UT in FIG. 6) indicates a touch input to a small object subject to heating guide image (SHI in FIG. 6), the second control module 320 may control the input interface 300 such that an image for guiding an optimal heating position of the small object subject to heating (e.g., SFI1 to SFI6 in FIG. 6) is displayed in one area of the input interface 300, which does not overlap with the position of the sensed object subject to heating.

The second control module 320, as described above, may perform various control functions. Detailed description in relation to this is described hereunder.

The induction heating device 1 according to an embodiment may also perform the function of wireless power transmission on the basis of the above-described configurations and features.

In recent years, technologies for wirelessly supplying power have been developed and have been widely used for various types of electronic devices. An electronic device, to which the wireless power transmitting technology is applied, can be charged only by being placed on a charge pad without connecting to an additional charge connector. Accordingly, the electronic device, to which the wireless power transmitting technology is applied, requires no cord or no charger, thereby ensuring improved mobility and a reduced size and weight.

The wireless power transmitting technology can be broadly classified as an electromagnetic induction technology using a coil, and a resonance technology using resonance, a radio emission technology for converting electric energy into microwaves and delivering the microwaves and the like. Among the technologies, the electromagnetic induction technology is a technology in which power is transmitted using electromagnetic induction between a primary coil provided at an apparatus for wirelessly transmitting power (e.g., a working coil (WC)) and a secondary coil provided at an apparatus for wirelessly receiving power.

The induction heating technology of an induction heating device 1 is substantially the same as the wireless power transmitting technology using electromagnetic induction, in that an object subject to heating is heated through electromagnetic induction.

Thus, the induction heating device 1 according to an embodiment may perform the functions of wireless power transmission as well as induction heating. Further, the second control module 320 or the first control module 310 may control induction heating mode or wireless power transmitting mode. Accordingly, when necessary, the function of induction heating or the function of wireless power transmission may be optionally performed.

The induction heating device 1 according to an embodiment has the above-described configurations and features. Below, a method of guiding an optimal heating position of a small object subject to heating of the induction heating device 1 is described with reference to FIGS. 6 to 12.

FIGS. 6 to 12 are views for describing a method of guiding an optimal heating position of a small object subject to heating of the induction heating device in FIG. 1.

Figure 10:
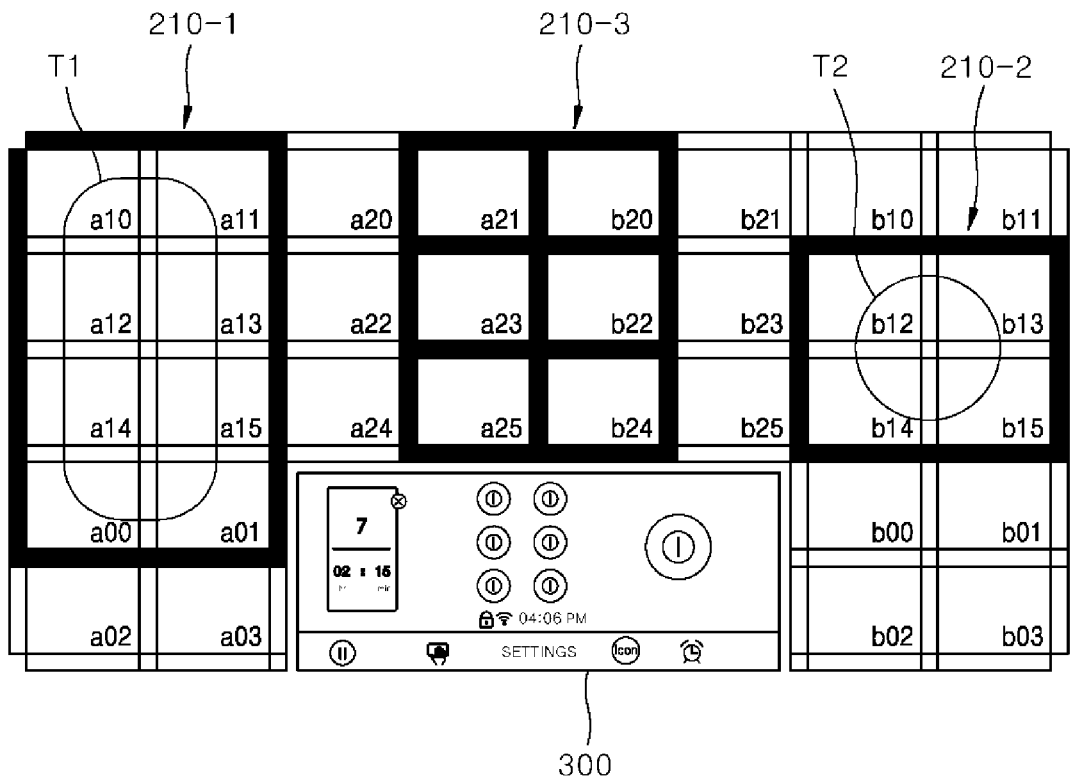
Figure 11:
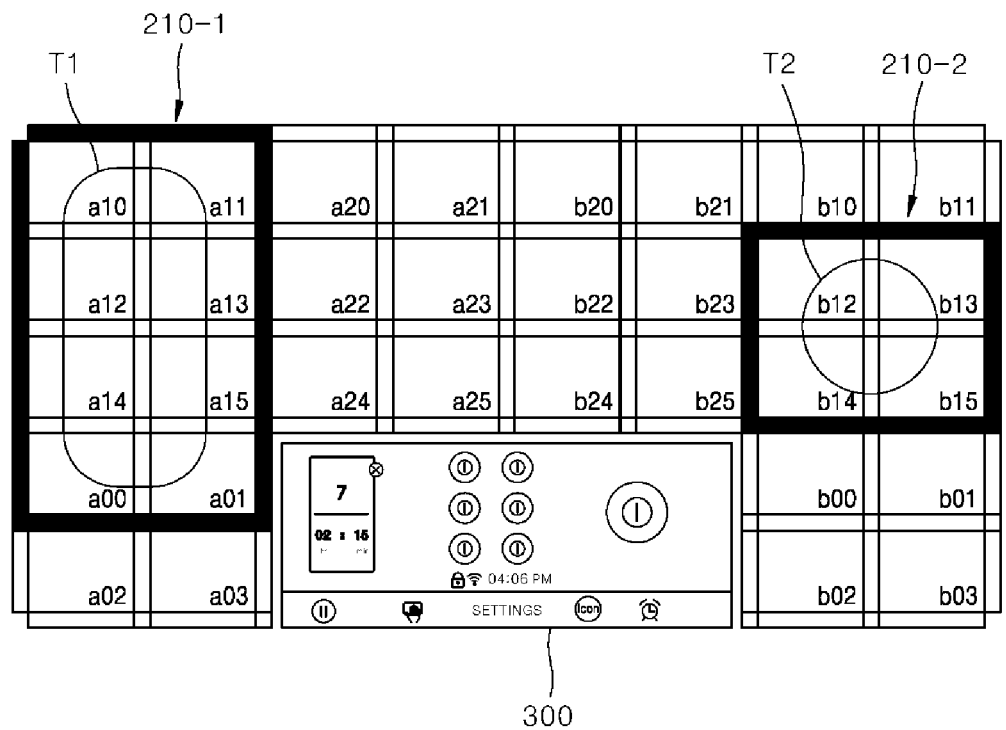
Figure 12:
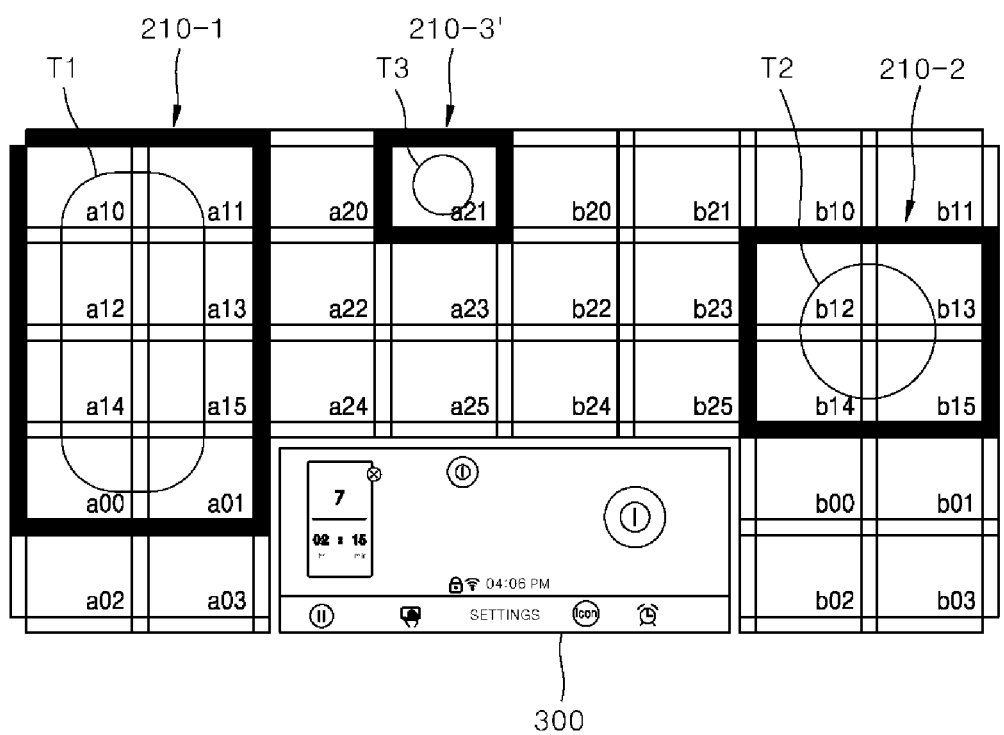

FIGS. 10 to 12 are views schematically illustrating a working coil, a light guide and an input interface for convenience of description. Additionally, positions of the first and second light guides 210-1, 210-2 illustrated in FIGS. 10 to 12 respectively correspond to positions of the burner images (FI1 and FI2) for the first and second objects subject to heating illustrated in FIGS. 6.

FIGS. 5 to 12 illustrate a method of guiding an optimal heating position of a small object subject to heating of the induction heating device 1 in FIG. 1.

A method of displaying a burner image for an object subject to heating on an input interface 300 is described, and then a method of guiding an optimal heating position of a small object subject to heating is described.

Specifically, when first and second objects subject to heating (T1 and T2) are placed on an upper plate (115 in FIG. 1) of a cover plate (119 in FIG. 1), a first control module 310 may sense a working coils on which is placed the first and second objects subject to heating (T1 and T2) at an upper side thereof among a plurality of working coils (a00 to a03, a10 to a15, a20 to a25, b00 to b03, b10 to b15 and b20 to b25).

A first control module 310 may detect a degree to which a resonance current flowing through each working coil is reduced, and, on the basis of results of the detection, may sense a working coils on which is placed the first and second objects subject to heating (T1 and T2) at an upper side thereof among a plurality of working coils.

When positions of the first and second objects subject to heating (T1 and T2) are sensed, the first control module 310 may supply information on the sensed positions of the first and second objects subject to heating (T1 and T2) to the second control module 320.

Further, the second control module 320 may control the input interface 300 such that burner images (FI1 and FI2) for the first and second objects subject to heating are displayed on the input interface 300 on the basis of the information on the positions of the first and second objects subject to heating (T1 and T2) supplied by the first control module 310.

Figure 6:
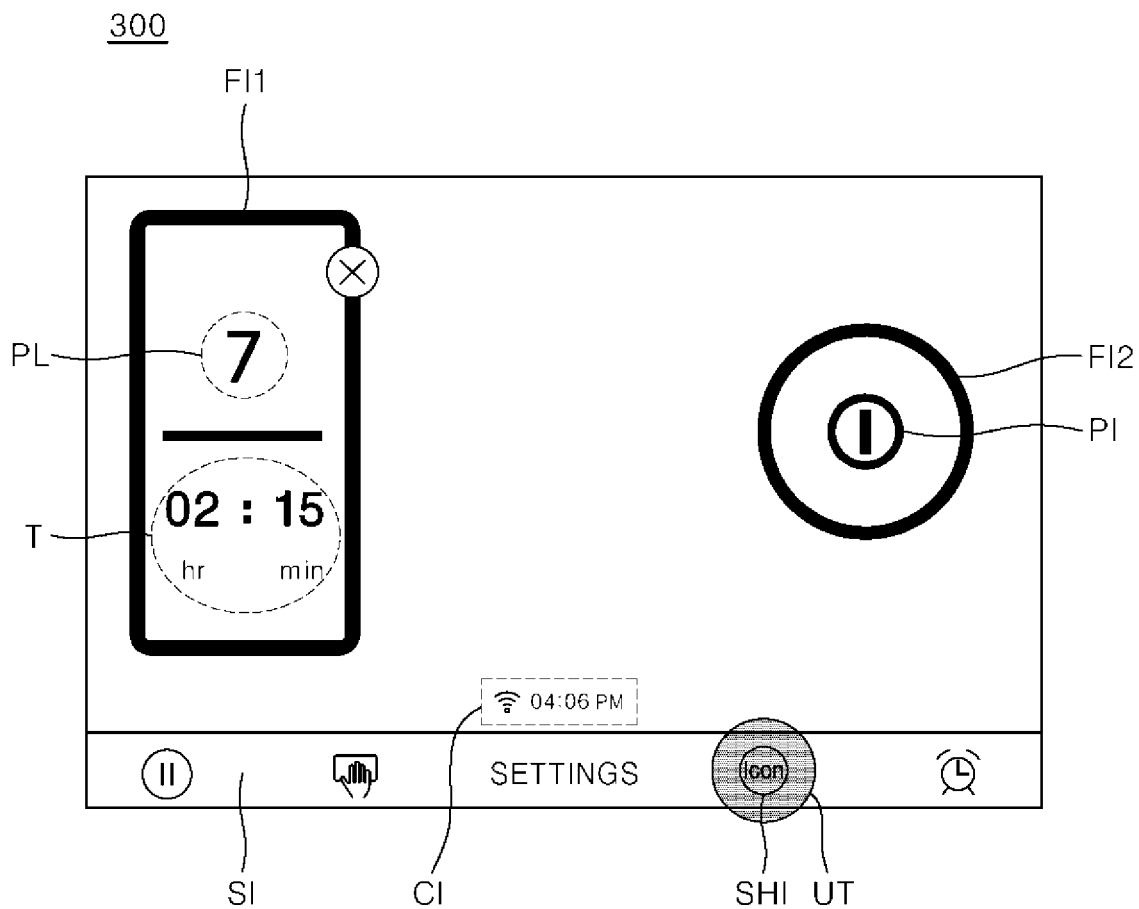
FIGS. 6 to 12 are views for describing a method of guiding an optimal heating position of a small object subject to heating of the induction heating device in FIG. 1 according to an exemplary embodiment of the present invention.

For example, as illustrated in FIG. 6, burner images (FI1 and FI2) for objects subject to heating, a setting image (SI) that displays a setting icon (e.g., a temporary stop icon, a screen lock icon, a setting list icon, a small object subject to heating guide icon (SHI; a small object subject to heating guide image), a timer icon and the like), and an auxiliary image (CI) that displays an auxiliary icon (e.g., a Wi-Fi connection state icon and a current time display icon) may be displayed on the input interface 300.

A burner image (FI1) for the first object subject to heating may be displayed in a specific area of the input interface 300 to correspond to the position of the first object subject to heating (T1) on the cover plate (119 in FIG. 1), and may be displayed by applying a size and a direction of rotation of the first object subject to heating (T1).

Certainly, a burner image (FI2) for the second object subject to heating may be displayed in a specific area of the input interface 300 to correspond to the position of the second object subject to heating (T2) on the cover plate (119 in FIG. 1), and may be displayed by applying a size and a direction of rotation of the second object subject to heating (T2).

That is, burner images (FI1 and FI2) for the first and second objects subject to heating may be displayed in specific areas of the input interface 300 corresponding respectively to actual positions of the first and second objects subject to heating (T1 and T2) on the upper plate (115 FIG. 1) on the basis of a scale of the upper plate (115 FIG. 1) of the cover plate (119 in FIG. 1) versus the input interface 300.

Further, a power image (e.g., PI) or a heating intensity image (PL), and a timer image (T) may be displayed at a center of each of the burner images (FI1 and FI2) for the first and second objects subject to heating.

For convenience of description, FIG. 6 illustrates a heating intensity image (PL) and a timer image (T) displayed at a center of the burner image (FI1) for the first object subject to heating, and a power image (PI) displayed at a center of the burner image (FI2) of the second object subject to heating.

Before an object subject to heating is placed on the upper plate 115 in a state in which the induction heating device 1 is turned on, the setting image (SI) and the auxiliary image (CI) may only be displayed on the input interface 300.

In case an object subject to heating is placed on the upper plate 115 and the first control module 310 senses a position of the object subject to heating as illustrated in FIG. 6, a burner image (e.g., FI1 and FI2) and a power image (e.g., PI1 and PI2) for the object subject to heating may be additionally displayed on the input interface 300.

When the user touches a power image displayed at a center of a burner image for an object subject to heating, a heating intensity image (e.g., PL) and a timer image (e.g., T) may be displayed at the center of the burner image (e.g., FI1) for the object subject to heating.

Through the above-described method, the burner images (FI1 and FI2) for the first and second objects subject to heating may be displayed on the input interface 300.

In case a small object subject to heating (e.g., a Moka pot) is placed on the upper plate (115 in FIG. 1) of the cover plate (119 in FIG. 1) at a position where the small object subject to heating does not overlap with the first and second objects subject to heating (T1 and T2) while the small object subject to heating is not concentrically placed at an upper side of a working coil (That is, the small object subject to heating is eccentrically placed at an upper side of a working coil.), energy efficiency is decreased, and cooking time is increased.

To solve the problem, a small object subject to heating guide image (SHI; i.e., a small object subject to heating guide icon) may be displayed in an area of the above-described setting image (SI) on the input interface 300 of the induction heating device 1.

Figure 7:
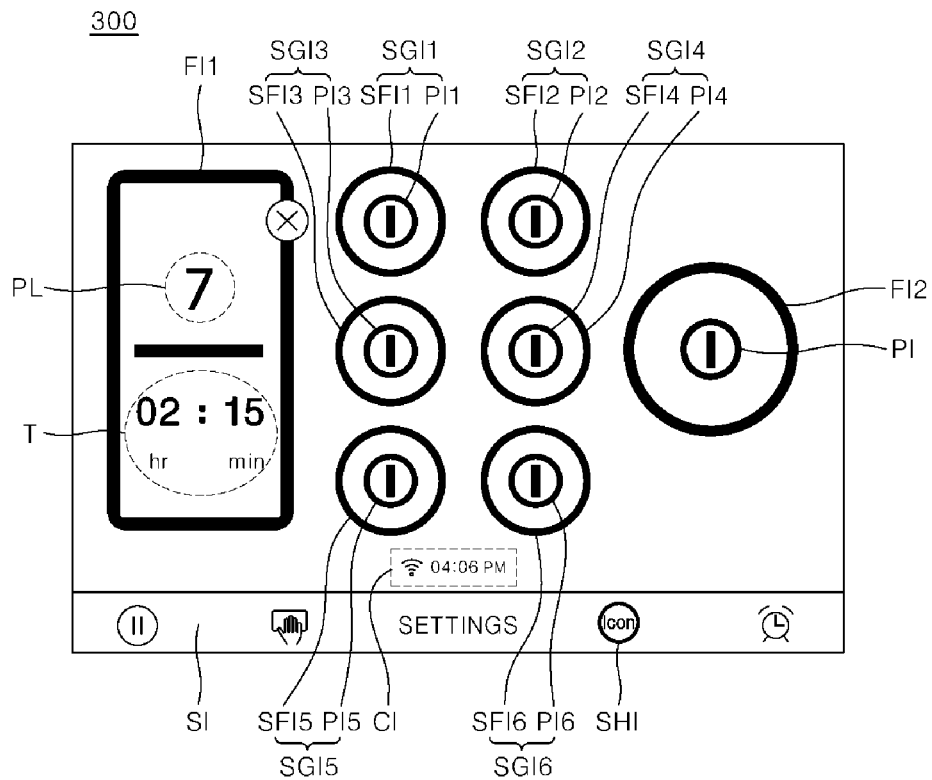

Accordingly, in case the user touches the small object subject to heating guide image (SHI) as illustrated in FIGS. 6 and 7 (i.e., a touch input (UT) supplied to the input interface 300 indicates a touch input to the small object subject to heating guide image (SHI)), the second control module 320 may control the input interface 300 such that an image (SGI1 to SGI6) for guiding an optimal heating position of the small object subject to heating is displayed in one area of the input interface 300, which does not overlap with the positions of sensed objects subject to heating (i.e., first and second objects subject to heating (T1 and T2)).

That is, in case a touch input (UT) supplied to the input interface 300 indicates a touch input to a small object subject to heating guide image (SHI), the input interface 300 supplies the touch input (UT) to the second control module 320, and the second control module 320 may control the input interface 300 such that an image (SGI1 to SGI6) for guiding an optimal heating position of the small object subject to heating is displayed in one area of the input interface 300, which does not overlap with positions of the first and second objects subject to heating (T1 and T2) on the basis of information on the positions of the first and second objects subject to heating (T1 and T2) supplied by the first control module 310 and the touch input (UT).

The image (SGI1 to SGI6) for guiding the optimal heating position of the small object subject to heating may include a burner image (SFI1 to SFI6) corresponding to the optimal heating position and a power image (PI1 to PI6) respectively.

Additionally, one area of the input interface 300 may include an area (e.g., a21, a23, a25, b20, b22 and b24) corresponding to a position of a working coil that is not placed at a lower side of the object subject to heating among the plurality of working coils (a00 to a03, a10 to a15, a20 to a25, b00 to b03, b10 to b15 and b20 to b25).

Certainly, one or more images (SGI1 to SGI6) for guiding an optimal heating position of a small object subject to heating may be provided, and may be displayed respectively at positions corresponding to one or more working coils (e.g., a21, a23, a25, b20, b22 and b24) that are not placed at the lower sides of the first and second objects subject to heating (T1 and T2) among the plurality of working coils (a00 to a03, a10 to a15, a20 to a25, b00 to b03, b10 to b15 and b20 to b25).

Figure 8:
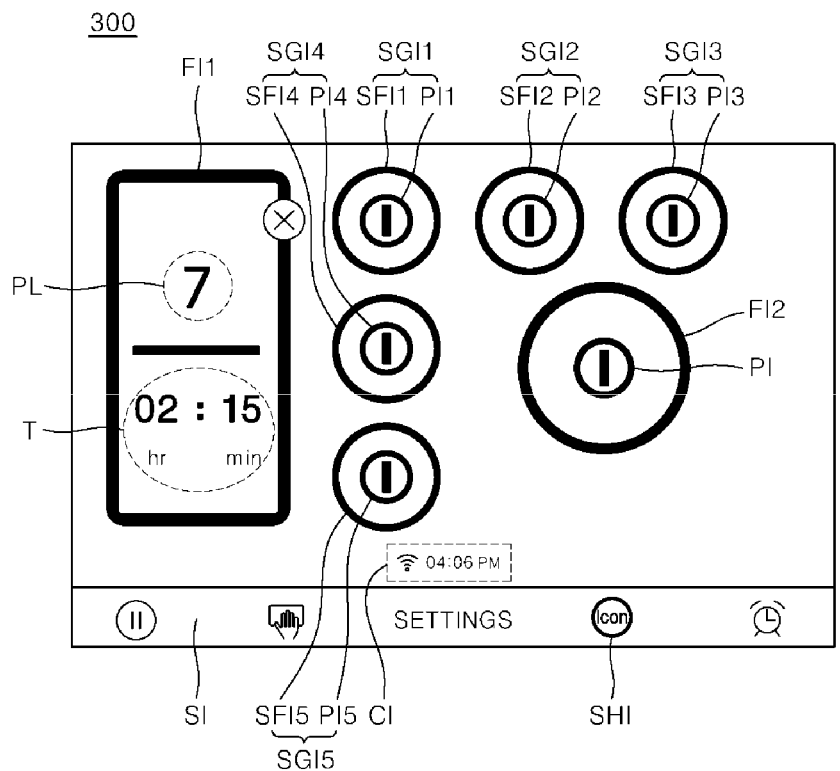

FIG. 8 illustrates a change in the positions and number of the images (SGI1 to SGI5) for guiding an optimal heating position of a small object subject to heating in case the second object subject to heating (T2) is placed at a position different from the position of the second object subject to heating in FIG. 7.

Figure 9:
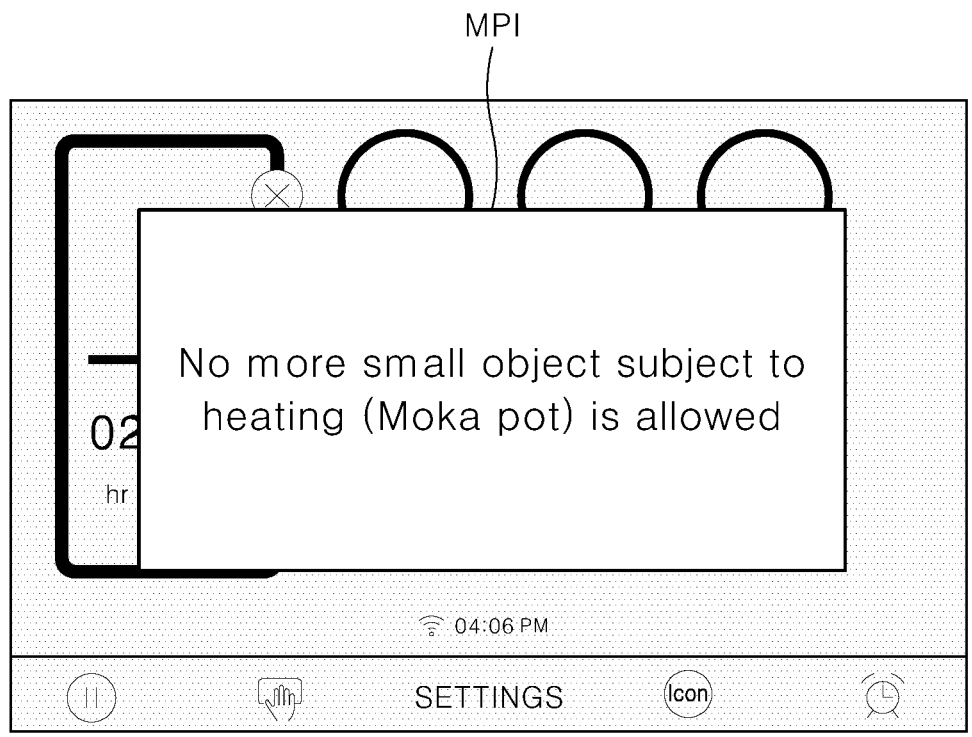

In case an area for displaying the image for guiding an optimal heating position of a small object subject to heating is not ensured on the input interface 300 (i.e., in case the upper plate (115 in FIG. 1) is already filled with a plurality of objects subject to heating) as illustrated in FIG. 9, the second control module 320 may control the input interface 300 such that a small object subject to heating arrangement disapproval image (MPI; e.g., "No more small vessel (a Moka pot) is allowed.") is displayed on the input interface 300.

The second control module 320, as illustrated in FIGS. 10 to 11, may control the input interface 300 such that an image (e.g., SGI1 to SGI6 in FIG. 7) for guiding an optimal heating position of a small object subject to heating is displayed in one area of the input interface 300, which does not overlap with positions of sensed objects subject to heating (the first and second objects subject to heating (T1 and T2)), and, at the same time, may alternately turn on and turn off a light-emitting element around a working coil placed at the optimal heating position of the small object subject to heating among the plurality of light-emitting elements.

Specifically, the second control module 320 may maintain a turn-on state of light-emitting elements around working coils (i.e., a00, a01, a10 to a15 and b12 to b15) placed at lower sides of the sensed objects subject to heating (e.g., the first and second objects subject to heating (T1 and T2)), and may alternately turn on and turn off light-emitting elements around working coils (i.e., a21, a23, a25, b20, b22 and b24) placed at the optimal heating position of the small object subject to heating.

That is, as the second control module 320 may maintain a turn-on state of light-emitting elements around working coils (i.e., a00, a01, a10 to a15 and b12 to b15) placed at lower sides of sensed objects subject to heating (e.g., the first and second objects subject to heating (T1 and T2)), light-emitting surfaces of light guides (210-1 and 210-2) placed at upper sides of the light-emitting elements may emit light. Additionally, as the second control module 320 alternately turn on and turn off light-emitting elements around working coils (i.e., a21, a23, a25, b20, b22 and b24) placed at an optimal heating position of a small object subject to heating, a light-emitting surface of a light guide (210-3) placed at upper sides of the light-emitting elements may flicker. That is, the light-emitting state in FIG. 10, and the light-emitting state in FIG. 11 may be alternately repeated.

In case an object subject to heating (T3) different from the first and second objects subject to heating (T1 and T2) is sensed at an optimal heating position (e.g., an upper side of a21) of a small object subject to heating within a predetermined period after an image (e.g., SGI1 to SGI6 in FIG. 7) for guiding the optimal heating position of the small object subject to heating is displayed on the input interface 300 as illustrated in FIG. 12, the second control module 320 may control the input interface 300 such that the image for guiding the optimal heating position of the small object subject to heating displayed on the input interface 300 is maintained (That is, an image (e.g., SGI1 in FIG. 7) corresponding to a position of the object subject to heating (T3) may only be maintained while the rest images (e.g., SGI2 to SGI6 in FIG. 7) may be removed.), and may maintain a turn-on state of a light-emitting element around the optimal heating position of the small object subject to heating (That is, a turn-on state of a light-emitting element around a21 may only be maintained and the rest light-emitting elements (i.e., light-emitting elements around a23, a25, b20, b22 and b24) may be turned off).

That is, the second control module 320 may only maintain a turn-on state of a light-emitting element around a working coil (i.e., a21) where a third object subject to heating (T3) is sensed among light-emitting elements around working coils (i.e., a21, a23, a25, b20, b22 and b24) placed at an optimal heating position of a small object subject to heating such that a light-emitting surface of a light guide (210-3') placed at an upper side of the light-emitting element only emits light.

In case an object subject to heating (T3) different from the first and second objects subject to heating (T1 and T2) is not sensed at an optimal heating position (e.g., at least one of a21, a23, a25, b20, b22 and b24) of a small object subject to heating within a predetermined period after an image (e.g., SGI1 to SGI6 in FIG. 7) for guiding the optimal heating position of the small object subject to heating is displayed on the input interface 300, the second control module 320 may control the input interface 300 such that the image (e.g., SGI1 to SGI6 in FIG. 7) for guiding the optimal heating position of the small object subject to heating is deleted from the input interface 300, and may turn off light-emitting elements (i.e., light-emitting elements around a21, a23, a25, b20, b22 and b24) that are being driven around the optimal heating position of the small object subject to heating.

That is, the second control module 320 may turn off all the light-emitting elements around working coils (i.e., a21, a23, a25, b20, b22 and b24) placed at the optimal heating position of a small object subject to heating such that light guides at upper sides of the light-emitting elements do not emit light.

As described above, the user may figure out about an optimal heating position of a small object subject to heating through the upper plate (115 in FIG. 1) as well as the input interface 300.

In summary, in case the user touches a small object subject to heating guide image (SHI) displayed on the input interface 300, the induction heating device 1 in FIG. 1 may suggest an optimal heating position of a small object subject to heating to the user through the input interface 300 and the upper plate (115 in FIG. 1).

As described above, the induction heating device 1 according to an embodiment may suggest an optimal heating position of a small object subject to heating to a user, thereby making it possible to reduce the possibility that the small object subject to heating is eccentrically placed at an upper side of a working coil and to solve problems such as decreased energy efficiency and increased cooking time and the like caused by the eccentric arrangement of the small object subject to heating.

The induction heating device 1 according to an embodiment may provide improved user experience and user interface, thereby enhancing user convenience under different conditions.

The present invention has been described with reference to the embodiments illustrated in the drawings. However, the invention is not limited to the embodiments and the drawings set forth herein. Further, various modifications may be made by one having ordinary skill in the art within the scope of the technical spirit of the invention. Further, though not explicitly described during description of the embodiments of the invention, effects and predictable effects according to the configuration of the invention should be included in the scope of the invention.

INDUSTRIAL APPLICABILITY

The present invention is applicable to an induction heating device that generates eddy currents in an object subject to heating made of a metallic material using a magnetic field which is generated around a coil when predetermined-magnitude high-frequency power is supplied to the coil, such that the object subject to heating itself is heated.

The invention claimed is:

1. An induction heating device, comprising:
a case;
a plurality of working coils provided in the case;
a cover plate coupled to an upper end of the case, the cover plate having an upper surface configured to support a first object to be heated by at least one of the plurality of working coils;
an input interface that is flatly buried into the upper surface of the cover plate, that is configured to receive a touch input from a user, and that is configured to display a specific image;
a first control module configured to sense which one of the plurality of working coils has the first object at an upper side thereof; and
a second control module that is configured to receive information on a position of the sensed first object from the first control module, that is configured to receive the touch input from the input interface, and that is configured to control the specific image displayed on the input interface based on at least one of the received information on the position of the first object or the received touch input,
wherein the input interface is configured to display an object guide image that is configured to receive the touch input for heating a second object to be heated on a portion of the upper surface of the cover plate, wherein a size of the second object is smaller than a size of the first object,
wherein the second control module is configured to, based on the touch input being received at the object guide image, control the input interface to display, before the user places the second object on the upper surface of the cover plate, an image indicating an optimal heating position of the second object in one area of the input interface that does not overlap with the position of the sensed first object, and
wherein the optimal heating position represents a position on the upper surface of the cover plate for the user to place the second object among areas where the first object is not placed such that the second object is concentrically placed at the upper side of one of the plurality of working coils.

2. The induction heating device of claim 1, wherein the one area of the input interface includes an area corresponding to a position of a working coil that is not disposed at a lower side of the first object among the plurality of working coils.

3. The induction heating device of claim 1, wherein the second control module is configured to control the input interface to display one or more images indicating the optimal heating position of the second object, and
wherein the one or more images indicating the optimal heating position of the second object are displayed respectively at positions corresponding to one or more working coils that are not disposed at a lower side of the first object among the plurality of working coils.

4. The induction heating device of claim 1, wherein, in case an area for displaying the image indicating the optimal heating position of the second object is not ensured on the input interface,
wherein the second control module controls the input interface such that an object arrangement disapproval image is displayed on the input interface.

5. The induction heating device of claim 1, wherein the induction heating device further includes:
a plurality of light guides installed around each of the plurality of working coils and configured to display whether each of the plurality of working coils operates and heating intensity of each of the plurality of working coils; and
a plurality of light-emitting elements controlled by the second control module and provided at a lower side of each of the plurality of light guides to emit light.

6. The induction heating device of claim 5, wherein the second control module is configured to, while the input interface displays the image indicating the optimal heating position of the second object, alternately turn on and turn off a light-emitting element around a working coil installed at the optimal heating position of the second object among the plurality of light-emitting elements.

7. The induction heating device of claim 6, wherein, in case an object different form the first object is not sensed at the optimal heating position of the second object within a predetermined period after the image for guiding the optimal heating position of the second object is displayed on the input interface, the second control module controls the input interface such that the image indicating the optimal heating position of the second object is deleted from the input interface, and turns off a light-emitting element placed and operating around the optimal heating position of the second object.

8. The induction heating device of claim 6, wherein, in case an object different form the first object is sensed at the optimal heating position of the second object within a predetermined period after the image indicating the optimal heating position of the second object is displayed on the input interface, the second control module controls the input interface such that the image indicating the optimal heating position of the second object displayed on the input interface is maintained, and maintains a turn-on state of a light-emitting element placed around the optimal heating position of the second object.

9. The induction heating device of claim 5, wherein the second control module controls the input interface such that a burner image for the first object is displayed on the input interface based on information on a position of the sensed first object, and
wherein the second control module controls driving of a light-emitting element around a lower side of the sensed first object among the plurality of light-emitting elements based on the information on the position of the sensed first object.

10. The induction heating device of claim 9, wherein the burner image for the first object is displayed in a specific area of the input interface to correspond to a position of the first object on the cover plate and is displayed by applying a size and a direction of rotation of the first object.

11. The induction heating device of claim 1, wherein the first control module receives the touch input from the second control module, and, based on the received touch input, controls driving of at least one of the plurality of working coils.

* * * * *